W. L. CLENDENNING.
TIRE.
APPLICATION FILED OCT. 1, 1921.

1,401,045. Patented Dec. 20, 1921.

William L. Clendenning
INVENTOR

BY Victor J. Evans
ATTORNEY

WITNESS:

UNITED STATES PATENT OFFICE.

WILLIAM L. CLENDENNING, OF PHILADELPHIA, PENNSYLVANIA, ASSIGNOR OF ONE-HALF TO ROSENA KELLY-WALKER, OF WILDWOOD, NEW JERSEY.

TIRE.

1,401,045.

Specification of Letters Patent.   Patented Dec. 20, 1921.

Application filed October 1, 1921. Serial No. 504,578.

*To all whom it may concern:*

Be it known that I, WILLIAM L. CLENDENNING, a citizen of the United States, residing at Philadelphia, in the county of Philadelphia and State of Pennsylvania, have invented new and useful Improvements in Tires, of which the following is a specification.

This invention relates to tires for vehicles and it has more particular reference to tires for self-propelled or motor driven vehicles of the type in which a pneumatic inner tube is separated or divided from direct contact with the outer cover by an interposed yielding means designed to protect said inner tube from puncture and the like.

The primary object of this invention is to provide a novel form of tire which will not collapse entirely even should the inner tube burst.

Another object is to provide a tire of the kind referred to in which the inflated inner tube is effectively protected from puncture and similar ills incident to hard wear and rough usage while the inner walls of the outer cover are armored and supported by a resilient non-collapsible structure of sufficient strength to always insure a degree of resiliency in the tire under the most untoward conditions.

A further object of this invention is to improve the efficiency of partly composite pneumatic and partly resilient tires whereby the same are rendered more durable with a consequential reduction in the costs of maintenance.

With the foregoing and other objects in view as will be more apparent from the following description my invention consists essentially in the novel features of construction, combination and arrangement of parts hereinafter fully described and later on more specifically defined by the appended claims.

In the further disclosure of the invention reference is to be had to the accompanying sheet of explanatory drawings constituting a part of this specification, and in which like characters of reference designate the same parts in both the views.

Figure 1:
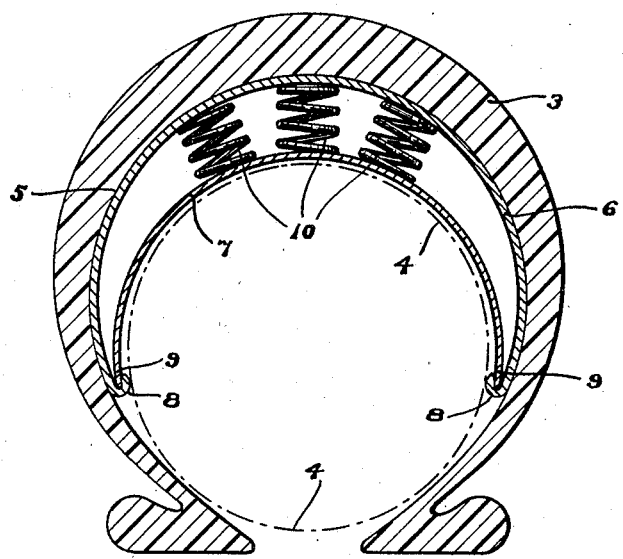
Figure 2:
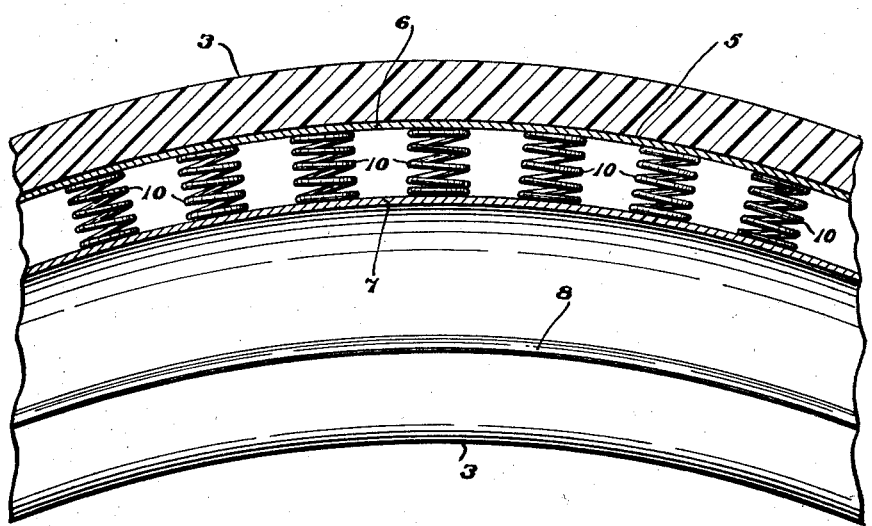

Figure 1— is a transverse section through a tire embodying my invention; and,

Fig. 2— is a fragmentary longitudinal section taken at right angles to the preceding figure.

Referring to the drawings the numeral 3 represents a broken portion of an ordinary tire outer cover of any of the well known and standard patterns while the dot-and-dash circle 4 in Fig. 1 indicates the inner or pneumatic tube therefor.

According to my invention I construct an annular inner shell 5 of non-puncturable material such as thin sheet metal and comprising outer and inner members 6, 7, respectively, both of which are segmental in cross-section as shown. The former or outer member 6 is of substantially larger segmental cross section than the inner one 7 and it is particularly to be noted that said outer member 6 has the edges thereof beaded or inwardly turned at 8 to provide a seat into which the peripheral edges 9 of the inner member 7 are sprung as will be clearly understood from an examination of the drawings whereby there is provided an annular shell 5 of crescent shaped cross section that is of an outer diameter to snugly fit into the outer cover 3. In order to provide a simple and effective means for maintaining the outer and inner members 6, 7, in proper spaced relation, I interpose therebetween at regular or staggered intervals radially disposed yielding or coil springs 10 which may be connected thereto in any of the well known ways to prevent their lateral displacement, or said springs 10 may be only connected to one of the said members 6 or 7.

In assembling my tire insert it will be readily seen that whether or not the springs 10 are attached to the outer or inner members 6 or 7 the latter can be easily sprung into the former, whereupon the completed annular shell 5 can be easily inserted in the outer cover 3 whereupon the inner tube 4 can be inflated in the well known ways.

From the foregoing description it will be readily seen that by my invention there is provided an exceedingly simple and exceedingly resilient insert, for pneumatic tires which serves the dual functions of protecting the inner tube from puncture while at the same time in the event of a "burst" the outer cover will to a great extent be prevented from damage due to riding on the wheel rims in that due to the peculiar form of the crescent-shaped shell there is provided a means that will retain the tire in place even under heavy loads.

While there has been shown and described one practical embodiment of the same it will be perfectly clear that the same is susceptible of minor changes in details such as the form or pattern of cross section for the insert and the right is hereby reserved to make such changes as fairly lie within the scope of the appended claims.

Having described my invention, what I claim as new and desire to secure by Letters Patent is:

1. The combination with a tire including an outer cover and an inflatable inner tube of an annular non-puncturable shell of crescent-shaped cross section, said shell comprising inner and outer members having interposed yielding means whereby they are retained in spaced relation.

2. The combination with a tire including an outer cover and an inflatable inner tube of an annular non-puncturable shell of crescent-shaped cross section, said shell comprising inner and outer members of segmental cross section, the inner member being adapted for interengaging connection with the peripheral edges of the outer member, and interposed yielding means between said inner and outer members whereby they are retained in interengaged spaced relation.

3. The combination with a tire including an outer cover and an inflatable inner tube of an annular non-puncturable shell of crescent-shaped cross section, said shell consisting of inner and outer segmental cross section annuli, the outer annulus having its peripheral edges inwardly turned to constitute seats into which the inner annulus is adapted to be sprung for interengaging connection, and yielding means interposed between said inner and outer annuli whereby they are retained in coöperative engagement.

4. A tire comprising in combination, an outer cover, an inflatable inner tube, an annular non-puncturable shell of crescent-shaped cross section separating said outer cover and inflatable inner tube, and said crescent-shaped cross section shell comprising inner and outer members having interposed yielding means whereby they are retained in spaced relation.

5. A tire comprising in combination, an outer cover, an inflatable inner tube, an annular non-puncturable shell of crescent-shaped cross section separating said outer cover and inflatable inner tube, said crescent-shaped shell comprising inner and outer members of segmental cross section, the inner member being adapted for interengaging connection with the peripheral edges of the outer member, and yielding means interposed between said inner and outer members whereby they are retained in interengaged spaced relation.

6. A tire comprising in combination, an outer cover, an inflatable inner tube, an annular non-puncturable shell of crescent-shaped cross section separating said outer cover and inflatable inner tube, said shell comprising inner and outer segmental cross section annuli, the outer annulus having its peripheral edges inturned to constitute seats into which the inner annulus is adapted to be sprung, and yielding means interposed between the inner and outer annuli whereby they are retained in coöperative engagement.

In testimony whereof I affix my signature.

WILLIAM L. CLENDENNING.